United States Patent
Hull (10) Patent No.: US 12,368,630 B2
(45) Date of Patent: Jul. 22, 2025

(54) IDENTIFYING NETWORK ISSUES IN A CLOUD COMPUTING ENVIRONMENT

(71) Applicant: Capital One Services, LLC, McLean, VA (US)

(72) Inventor: Christopher B. Hull, Bethesda, MD (US)

(73) Assignee: Capital One Services, LLC, McLean, VA (US)

( * ) Notice: Subject to any disclaimer, the term of this patent is extended or adjusted under 35 U.S.C. 154(b) by 49 days.

(21) Appl. No.: 17/101,775

(22) Filed: Nov. 23, 2020

(65) Prior Publication Data

US 2022/0166660 A1    May 26, 2022

(51) Int. Cl.
  *G06F 15/16*   (2006.01)
  *H04L 41/06*   (2022.01)
  *H04L 43/0823* (2022.01)
  *H04L 67/10*   (2022.01)

(52) U.S. Cl.
  CPC .......... *H04L 41/06* (2013.01); *H04L 43/0847* (2013.01); *H04L 67/10* (2013.01)

(58) Field of Classification Search
  None
  See application file for complete search history.

(56) References Cited

U.S. PATENT DOCUMENTS 10,498,601 B2    12/2019  Ahuja et al.
10,693,711 B1 *   6/2020  Garg ..................... G06F 11/079

(Continued)

FOREIGN PATENT DOCUMENTS

WO    WO-2009007586 A1 *  1/2009 ..... H04N 21/234327
WO    WO-2014105095 A2 *  7/2014 ........... H04N 17/004

(Continued)

OTHER PUBLICATIONS

International Search Report and Written Opinion of the International Searching Authority directed to related International Patent Application No. PCT/US21/60566, mailed Feb. 25, 2022; 27 pages.

(Continued)

*Primary Examiner* — Yves Dalencourt
(74) *Attorney, Agent, or Firm* — Sterne, Kessler, Goldstein & Fox P.L.L.C.

(57) ABSTRACT

Provided herein are system, apparatus, device, method and/or computer program product embodiments, and/or combinations and sub-combinations thereof for identifying a network issue in a cloud computing environment. In some embodiments, an analytics engine receives a stream of data packets being transmitted from an application to a cloud computing resource. The analytics engine inspects each data packet the stream of data packets and identifies a failure of transmission of a data packet of the stream of data packets. The analytics engine maps an occurrence of the failure of the transmission of the data packet on a graph of a cloud computing environment. The analytics engine identifies a network issue for an element associated with the cloud computing resource, inside the cloud computing environment, based on the mapping and independent of visibility of the stream of data packets inside the cloud computing environment.

20 Claims, 5 Drawing Sheets

(56) References Cited

U.S. PATENT DOCUMENTS

| | | | |
|---|---|---|---|
| 2003/0110252 A1* | 6/2003 | Yang-Huffman | H04L 41/046 709/224 |
| 2005/0243725 A1* | 11/2005 | Wrenn | H04L 69/40 370/238 |
| 2009/0271656 A1* | 10/2009 | Yokota | H04L 41/0677 714/E11.03 |
| 2014/0126468 A1* | 5/2014 | Filgueiras | H04L 1/1812 370/328 |
| 2015/0358391 A1 | 12/2015 | Moon et al. | |
| 2018/0076992 A1* | 3/2018 | Nabetani | H04L 1/1845 |
| 2018/0227208 A1* | 8/2018 | Rutkowski | H04L 41/0677 |
| 2018/0234459 A1 | 8/2018 | Kung et al. | |
| 2018/0249388 A1* | 8/2018 | Baek | H04W 36/0069 |
| 2019/0068622 A1 | 2/2019 | Lin et al. | |
| 2019/0087252 A1* | 3/2019 | Li | G06F 11/076 |
| 2019/0342426 A1 | 11/2019 | Momchilov | |
| 2019/0379572 A1 | 12/2019 | Yadav et al. | |
| 2020/0036627 A1* | 1/2020 | Li | H04L 43/10 |
| 2020/0106660 A1* | 4/2020 | Kakani | H04L 41/0645 |
| 2020/0134534 A1* | 4/2020 | Malapaka | G06N 20/00 |
| 2020/0184355 A1* | 6/2020 | Mehta | G06N 20/00 |
| 2020/0287807 A1 | 9/2020 | Zhong et al. | |
| 2020/0322242 A1 | 10/2020 | Malysh et al. | |
| 2020/0382396 A1* | 12/2020 | Scott | H04L 67/10 |

FOREIGN PATENT DOCUMENTS

| | | | | |
|---|---|---|---|---|
| WO | WO-2019184557 A1 * | 10/2019 | | H04L 41/0631 |
| WO | WO-2021259467 A1 * | 12/2021 | | |

OTHER PUBLICATIONS

Extended European Search Report for EP Application No. EP 21895816.3, Munich, Germany, mailed on Sep. 23, 2024, 8 pages.

* cited by examiner

IDENTIFYING NETWORK ISSUES IN A CLOUD COMPUTING ENVIRONMENT

BACKGROUND

Cloud computing environments provide infrastructure and services to various clients. These clients transmit requests to be processed by the cloud computing environments. However, the clients do not have any visibility inside the cloud computing environments. In view of this, when there are any issues with processing requests, the clients rely on the provider of the cloud computing environment to identify and resolve the issue. This can be a very time-consuming process and may cause expensive downtime for the clients.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Provided herein are system, apparatus, device, method and/or computer program product embodiments, and/or combinations and sub-combinations thereof, for identifying network issues in a cloud computing environment.

In an embodiment, an analytics engine residing in a server in communication with an application receives a stream of data packets being transmitted from an application to a cloud computing resource. The analytics engine inspects each data packet in the stream of data packets and identifies that transmission of a data packet of the stream of data packets has failed. The analytics engine maps an occurrence of the failure on a graph of a cloud computing environment, including the cloud computing resource and elements of the cloud computing environment. The analytics engine identifies a network issue for an element associated with the cloud computing resource, inside the cloud computing environment, based on the mapping and independent of visibility of the stream of data packets inside the cloud computing environment.

The system solves the technical problem of being able to identify a network issue in a cloud computing environment without having visibility inside the cloud computing environment. This configuration allows for identifying the scope of network issues in the cloud computing environments so that the network issues can be easily resolved, which eliminates possible downtime of an application and data processing time.

As an example, an application may transmit a request to process a credit card transaction to the cloud computing environment. In the event that an unidentified network issue exists in the cloud computing environment, the credit card transaction may fail to be processed or time-out. In an effort to avoid such situations, the network issues may need to be quickly identified and resolved. Embodiments herein provide for a solution to avoid these issues.

Figure 1:
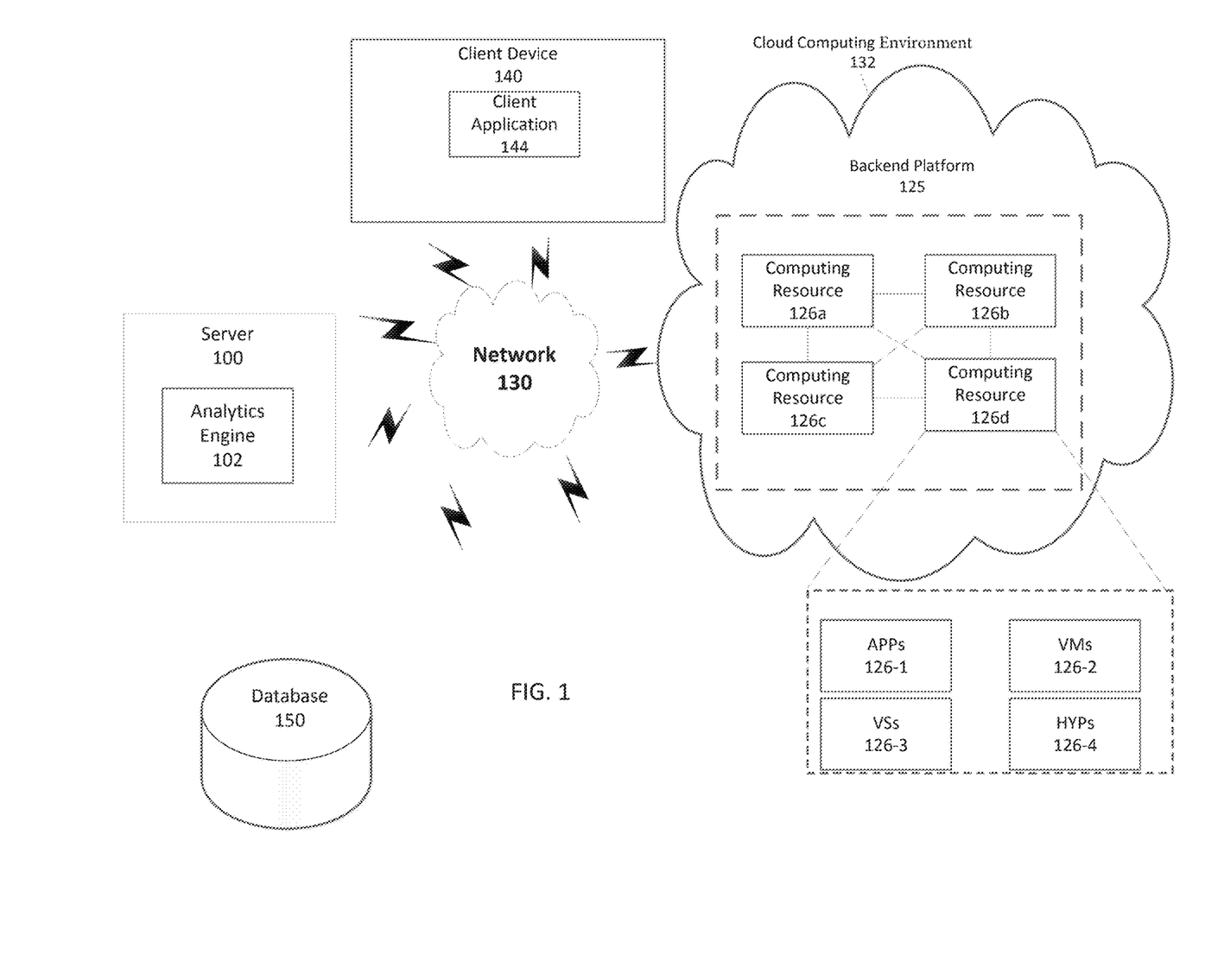
FIG. 1 is a block diagram of an example environment in which systems and/or methods described herein may be implemented.

FIG. 1 is a block diagram of an example environment in which systems and/or methods described herein may be implemented. The environment may include server 100, a client device 140, a database 150, and a cloud computing environment 132. Server 100 may include an analytics engine 102, and client device 140 may include a client application 144. Client device 140 may interface with server 100 using client application 144.

The devices of the environment may be connected through, for example, wireless connections. In an example embodiment, one or more portions of the network 130 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 125 may include a server or a group of servers. In an embodiment, the backend platform 125 may be hosted in a cloud computing environment 140. A person of skill in the art would appreciate that the backend platform 125 may not be cloud-based, or may be partially cloud-based.

The cloud computing environment 132 includes an environment that delivers computing as a service, whereby shared resources, services, etc. may be provided to server 100. The cloud computing environment 132 may provide computation, software, data access, storage, and/or other services that do not require end-user knowledge of a physical location and configuration of a system and/or a device that delivers the services. The cloud computing system 132 may include computer resources 126. Server 100 may reside inside the cloud computing environment 132. Alternatively, server 100 may reside partially outside the cloud computing environment 132 or entirely outside the cloud computing environment 132.

The cloud computing environment 132 may be provided by a third-party vendor. For example, the vendor may be AMAZON WEB SERVICES (AWS) (developed by AMAZON), IBM CLOUD (developed by IBM), MICROSOFT AZURE (developed by Microsoft), or the like. The cloud computing environment 132 may provide Infrastructure as a Service (Iaas), Software as a Service (SaaS), Platform as a Service (PaaS), or a combination of all three. Server 100 and client device 140 may not have visibility of the network traffic inside the cloud computing environment.

Each cloud computing resource 126a-d includes one or more computers, server devices, or other types of computation and/or communication devices. The cloud computing resource(s) 126a-d may host the backend platform 125. The cloud computing resources 126a-d may include compute instances executing in the cloud computing resources 126a-d. In an embodiment, the cloud computing resources 126a-d may communicate with other cloud computing resources 126a-d via wireless connections.

Each cloud computing resource 126a-d may include a group of cloud resources, such as one or more applications ("APPs") 126-1, one or more virtual machines ("VMs") 126-2, virtualized storage ("VS") 126-3, and one or more hypervisors ("HYPs") 126-4.

Application 126-1 may include one or more software applications that may be provided to or accessed by server 100 or the client device 144. The application 126-1 may eliminate a need to install and execute software applications on server 100. The application 126-1 may include software associated with backend platform 125 and/or any other software configured to be provided across the cloud computing environment 132. The application 126-1 may send/receive information from one or more other applications 126-1, via the virtual machine 126-2.

Virtual machine 126-2 may include a software implementation of a machine (e.g., a computer) that executes programs like a physical machine. Virtual machine 126-2 may be either a system virtual machine or a process virtual machine, depending upon the use and degree of correspondence to any real machine by virtual machine 126-2. A system virtual machine may provide a complete system platform that supports execution of a complete operating system (OS). A process virtual machine may execute a single program and may support a single process. The virtual machine 126-2 may execute on behalf of a user (e.g., user device 140) and/or on behalf of one or more other backend platforms 125, and may manage infrastructure of cloud computing environment 140, such as data management, synchronization, or long-duration data transfers.

Virtualized storage 126-3 may include one or more storage systems and/or one or more devices that use virtualization techniques within the storage systems or devices of cloud computing resource 126. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically stored. This may enable optimization of storage use, server consolidation, and/or performance of non-disruptive file migrations.

Hypervisor 126-4 may provide hardware virtualization techniques that allow multiple operations systems (e.g., "guest operating systems") to execute concurrently on a host computer, such as cloud computing resource 126. Hypervisor 126-4 may present a virtual operating platform to the guest operating systems and may manage the execution of the guest operating systems multiple instances of a variety of operating systems and may share virtualized hardware resource.

Cloud computing environment 132 may include a network layer. The network layer may include switches, routers, firewalls, load balancers, and other network components to transmit data packets within cloud computing environment 132. In some instances, the network components may be virtualized or utilize Software Defined Networks (SDN). Furthermore, the network layer extends connectivity with external networks outside of cloud computing environment 132. The external networks may include the Internet, virtual private networks, dedicated connections, shared connections, or the like.

In an embodiment, client application 144 may transmit a request to a cloud computing resource 126a-d in the computing environment 132. As an example, the request may be for a service to be processed by the cloud computing resource 126a-d. As described above, the cloud computing resource 126a-d may be a service, application, data storage device, or the like. The cloud computing resource 126a-d may be configured to process the request. The request may include a stream of data packets. Each data packet of the stream of data packets may include a header including source and destination, such as an Internet Protocol (IP) address and Transport Control Protocol (TCP) port information. For example, the destination IP address and TCP port can correspond to the cloud computing resource 126a-d intended to receive the data packet. Transmitting data packets using TCP allows for automatic retransmissions when an attempted data transmission of a data packet fails. Sequence numbers of the TCP may be updated for each attempted retransmission.

The data packet can further include payload data in one or more layers of the data packet. The layers can include one or more of a physical layer, da a link layer, network layer, transport layer, session layer, presentation layer, and application layer.

Analytics engine 102 may execute a Deep Packet Inspection (DPI) on each data packet. DPI is a method of inspecting each data packet transferred over a network. The DPI methodology is configured to locate, identify, classify, reroute, or block packets based on the contents of the headers and payload data of the data packet. Analytics engine 102 may probe the header and payload data of each data packet of the stream of data packets by executing the DPI. Analytics engine 102 may identify an attempted retransmission of the data packet to the cloud computing resource, based on the probe of the data packet. Analytics engine 102 may identify a failure of transmission of a data packet based on more than a threshold number of attempted retransmissions of the data packet based on the sequence numbers of the TCP. Analytics engine 102 may generate an alert for each identified failed transmission. Each alert may be stored in database 150.

Analytics engine 102 may identify the cloud computing resource 126a-d intended to receive the data packet based on an IP address and TCP port of the cloud computing resource included in the data packet. Analytics engine 102 may map the occurrence of the transmission failure on a graph of a cloud computing environment that includes the cloud computing resource and elements of the cloud computing environment.

The graph may include a layout of the cloud computing environment 132. As an example, the cloud computing environment 132 may be grouped in a hierarchical structure, including elements such as accounts, regions, data centers, subnets, and cloud computing resources 126a-d. Each account may include or be associated with one or more regions. Each region may include one or more data centers. The region may be a geographic region where data centers are located. Each data center may support and execute one or more instances of an application. More than one data center may support and execute the same application. In other embodiments, the cloud computing environment 132 includes elements such as virtual interfaces, dedicated cloud interfaces, or the like. In view of this, analytics engine 102 may map the occurrence of the transmission failure on a location on the graph corresponding to the instance of the cloud computing resource intended to receive the data packet (e.g., an instance of the cloud computing resource residing in a given data center, of a given region, associated with a given account).

Analytics engine 102 may map each occurrence of a failure of transmission of a given data packet on the graph of the cloud computing environment 132. Analytics engine 102 may correlate the alerts regarding the failed transmissions stored in database 150 with the map to identify a network issue associated with an element of a cloud computing environment 132. Analytics engine 102 may identify a network issue for a given element inside the cloud computing environment 132, based on identifying more than a threshold number of occurrences of data packet transmission failures associated with the given element within a predetermined time interval.

For example, analytics engine 102 may determine that there is a network issue in a given region of a cloud computing environment 132 based on more than a threshold number of transmission failures of data packets intended to be transmitted to the given region in a predetermined time interval. Similarly, analytics engine 102 may determine that there is a network issue with a given account, data center, or cloud computing resource, based on the number of transmission failures of data packets intended to be transmitted to the given account, data center, or cloud computing resource in a predetermined time interval.

Analytics engine 102 may generate a report including the identified network issue and the element of the cloud computing environment 132. The report may be transmitted to the cloud computing environment provider (e.g., an administrator account of the cloud computing environment). The report may include the total number of data transmission failures and the predetermined amount of time. Alternatively, analytics engine 102 may transmit an alert to the cloud computing environment provider. The alert may indicate the identified network issue and the associated element of the cloud computing environment 132. Furthermore, the alert may include the total number of data transmissions failures in the predetermined amount of time.

In an alternative embodiment, the cloud computing resources 126a-d may generate a response each attempt to establish a connection with the cloud computing resource 126a-d by a client application 144 or another cloud computing resource 126a-d. For example, if cloud computing resource 126a attempts to establish a connection with cloud computing resource 126b, cloud computing resource 126b transmits a response based on forming the connection. A service in the cloud computing environment 132 may generate this log file and may update the log file periodically. The log file may include records of this forward traffic and return traffic. The forward traffic may include an identification of a source IP address and TCP port and a destination IP address and TCP port. When transmitting the attempt to form the connection, the forward traffic may include an identification of a source IP address and TCP port of where this attempt originated, and identification of a destination IP address and TCP port for the intended cloud computing resource. The return traffic may also include a source IP address and TCP port and a destination IP address and TCP port. However, the source of the return traffic is the destination of the forward traffic, and the destination of the return traffic is the source of the forward traffic. For example, when the cloud computing resource 126b is transmitting a response, the source IP address and TCP port correspond with the cloud computing resource 126b and a destination IP address and TCP port corresponds with cloud computing resource 126a. The log file may also include time stamps of the forward and return traffic. The cloud computing environment 132 may transmit the log file to server 100 after a predetermined amount of time.

Server 100 may receive a log file, including related information between client application 144 and the cloud computing environment. Analytics engine 102 may identify an occurrence of one-way communication from client application 144 to a cloud computing resource 126a-d or between two cloud computing resources 126a-d, based on a lack of return traffic from a cloud computing resource corresponding to forward traffic in the log file.

For example, cloud computing resource 126b may have received a connection attempt from cloud computing resource 126a. The forward traffic for this connection attempt may have been logged in the log file. However, the cloud computing resource 126b may have failed to transmit a response to cloud computing resource 126a. Due to this send-receive mismatch, analytics engine 102 may determine that even though the log file includes a record of the forward traffic including the source IP address and TCP port of cloud computing resource 126a and the destination IP address and TCP port of the cloud computing resource 126b—the log file does not include a record of any return traffic in which the source IP address and TCP port is that of cloud computing resources 126b and the destination IP address and TCP port is that of cloud computing resource 126a. Analytics engine 102 may identify this as a one-way communication. The one-way communication indicates a failed connection.

Analytics engine 102 may generate an alert due to identifying more than a threshold number of occurrences of the one-way communication for a given cloud computing resource. The alert may be stored in database 150.

Analytics engine 102 may map the occurrence of the one-way communication on the graph of the cloud computing environment 132 in a location of the graph corresponding to the cloud computing resource 126a-d. Analytics engine 102 may map each occurrence of the one-way communication over a predetermined time interval on the graph of the cloud computing environment 132 based on the timestamps in the log file.

Analytics engine 102 may correlate the alerts of the one-way communication for a given cloud computing resource with the map to identify a network issue. Analytics engine 102 may identify a network issue for a given element inside the cloud computing environment when a total number of occurrences of the one-way communication associated with a given element of the cloud computing environment 132 is more than a threshold number over a predetermined time interval.

The log file is iteratively updated by the service in the cloud computing environment 132 and transmitted to server 100 after a predetermined time interval. In one embodiment, analytics engine 102 may map the occurrences of one-way communication identified for multiple iterations of the log file. Alternatively, analytics engine 102 may reset the mapped occurrences after each iteration of the log file received by server 100.

In other embodiments, the analytics engine may correlate the alerts of the data transmission failures, the map of the failed transmissions, the alerts of the one-way communications, and the map of the one-way communications to identify a network issue with an element in the cloud computing environment 132. For example, analytics engine 102 may determine that the failed transmissions and one-way communications are all correlated with an element in the cloud computing environment 132.

These configurations allow the analytics engine to identify network issues with the elements inside the cloud computing environment, without having visibility inside the cloud computing environment. By doing so, analytics engine 102 may recommend a different method or resource to the client applications so that the client applications are still able to complete their requests. The methods may include accessing different regions of the cloud computing environment based on a network issue identified in a given region, processing a request internally, or the like. This eliminates downtime caused by network issues. Analytics engine 102 may also inform the cloud environment provider of the network issue so that the provider may quickly resolve the issue.

Figure 2:
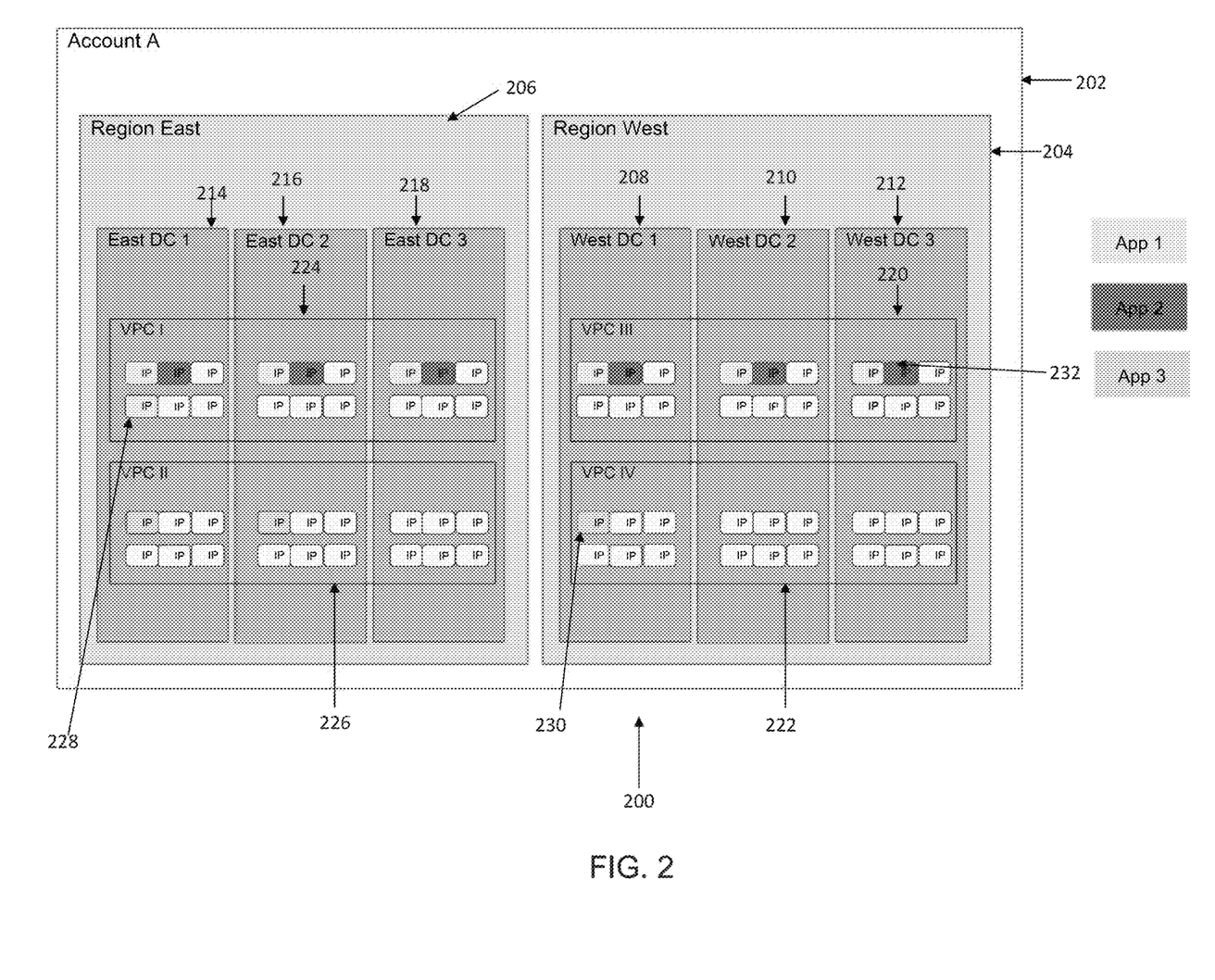
FIG. 2 is a graph of the cloud computing environment according to an example embodiment.

FIG. 2 is a graph 200 of the cloud computing environment according to an example embodiment. Graph 200 depicts an example layout of the cloud computing environment. In the example shown in FIG. 2, graph 200 may include Account A 202, Region West 204, Region East 206, West DC 1 208, West DC 2 210, West DC 3 212, East DC 1 214, East DC 2 216, and East DC 3 218. Account A 202, Region West 204, Region East 206, West DC 1 208, West DC 2 210, West DC 3 212, East DC 1 214, East DC 2 216, and East DC 3 218 may correspond with elements of a cloud computing environment.

Account A 202 may be a cloud computing account with access to Region West 204 and Region East 206. Region West 204 and Region East 206 may be geographic regions where data centers are located. For example, Region West 204 may correspond to data centers located in the western part of the United States (e.g., California, Arizona, Washington, etc.). Region East 206 may correspond with data centers located in the eastern part of the United States (e.g., Virginia, Florida, North Carolina, etc.). Numerous different accounts may have access to Region West 204 and Region 206.

West DC 1 208, West DC 2 210, and West DC 3 212 may be data centers (DCs) located in Region West 204. East DC 1 214, East DC 2 216, and East DC 3 218 may be data centers located in Region East 206.

West DC 1 208, West DC 2 210, and West DC 3 212 may be located within a given proximity of each other. East DC 1 214, East DC 2 216, and East DC 3 218 may be located within a given proximity of each other. West DC 1 208, West DC 2 210, and West DC 3 212 may include redundant power, networking, and connectivity in Region West 202, Similarly, East DC 1 214, East DC 2 216, and East DC 3 218 may include redundant power, networking, and connectivity in Region Ease 204.

West DC 1 208, West DC 2 210, West DC 3 212, East DC 1 214, East DC 2 216, and East DC 3 218 data centers are centralized locations where computing and networking equipment is located to collect, store, process, distribute or allow access to large amounts of data. West DC 1 208, West DC 2 210, West DC 3 212, East DC 1 214, East DC 2 216, and East DC 3 218 may include cloud computing resources.

VPC I 224, VPC II 226, VPC III 220, and VPC IV 222 may be subnet groups. VPC I 224, VPC II 226, VPC III 220, and VPC IV 222 may also be elements of the cloud computing environment. East DC 1 214, East DC 2 216, and East DC 3 218 include cloud computing resources assigned to VPC I 224 and include cloud computing resources assigned to VPC II 226. Similarly, West DC 1 208, West DC 2 210, and West DC 3 212 include cloud computing resources assigned to VPC III 220 and cloud computing resources assigned to VPC IV 222. The subnet groups are used to assign IP addresses to the cloud computing resources.

As an example, the cloud computing resources correspond to applications of a given type. Each subnet group may be configured to execute an instance of an application of a given time. For example, West DC 1 208, West DC 2 210, West DC 3 212, East DC 1 214, East DC 2 216, and East DC 3 218 may execute instances of application 228, application 230, and application 232. Applications 228 and 232 may be assigned to subnet groups VPC I 224, and VPC III 220, respectively. Application 230 may be assigned to subnet groups VPC II 226 and VPC IV 222. Application 228, 230, and 232 may correspond with cloud computing resources. Application 228, 230, and 232 may also be elements of the cloud computing environment.

As a non-limiting example, a client application may transmit a request to application 228. The request may be for processing a credit card transaction. The request may include a stream of data packets. A copy of the stream of data packets may be transmitted to the server (e.g., server 100, as shown in FIG. 1). The analytics engine (e.g., analytics engine 102, as shown in FIG. 1) may probe each data packet using DPI. The analytics engine may identify a failed transmission of a data packet based on a total number of attempted retransmissions of the data packet being more than a threshold number over a predetermined time interval. Alternatively, the analytics engine may identify a failed transmission of the data packet based on a data packet being dropped.

The analytics engine may identify the IP address and TCP port of application 228 from the header of the data packet. The analytics engine may determine that the instance of the application to which the client application was attempting to transmit the data packet is located in East DC 1 214, based on the IP address and TCP port of application 228. The analytics engine may map the data packet transmission failure on graph 200 at the location of application 228 in East DC 1 214.

Different client applications or the same client application may also transmit requests for instances of an application executing in East DC 1 124. The analytics engine may identify further transmission failures of data packets being transmitted to instances of applications executed in the East DC 1 124. The analytics engine may generate an alert for each identified failed transmission to application 228 or any other application in the East DC 1 124 over a period of time. The alerts may be stored in the database.

The analytics engine may map each of the occurrences on graph 200 at the location of the respective instances of the applications in East DC 1 214. The analytics engine may correlate the alerts of the failed transmissions for each application in the East DC 1 124 with the map of each occurrence on graph 200. The analytics engine determines whether these occurrences occurred within a predetermined time interval. In light of this, the analytics engine may determine that a network issue exists with East DC 1 214 based on the number of these occurrences being more than a threshold number of occurrences and occurring within a predetermined time interval.

For example, the analytics engine may identify a 5% increase in failure of data transmissions over a 5 minute period with applications in East DC 1 214. This may indicate that there is a network issue with East DC 1 214.

The analytics engine may generate a report indicating the network issue with East DC 1 214. The analytics engine may also transmit a message to the client applications attempting to access applications in East DC 1 214. The message may include an indication of the network issue with East DC 1 214. Furthermore, the message may include a recommendation for accessing other instances of the same application executing in other data centers, such as East DC 2 216 or West DC 3 212.

In another non-limiting example, the server may receive a log file from the cloud computing environment 132. The log file may include records of forward and return traffic from attempted connections. For example, a client application may attempt to form a connection with the instance application 230 executing in West DC 1 208. The attempted connection may be included in the log file. The analytics engine may determine that the log file includes forward traffic, including the source IP address and TCP port of the client application and a destination IP address and TCP port of the instance of application 230 executing in West DC 1 208. However, the instance of the application 130 executing in West DC 1 208 may not transmit a response to the client application. Due to this, the analytics engine may determine that the log file does not include a matching record showing a source IP address and TCP port of the instance of application 130 executing in West DC 1 208 and a destination IP address and TCP port of the client application. The analytics engine may identify this as a one-way communication.

The analytics engine may determine further occurrences of a one-way communication with the application 230 executing in West DC 1 208. The analytics engine may generate an alert for each occurrence of a one-way communication with the instance of the application 130 executing in West DC 1 208.

The analytics engine may map each one of these occurrences on graph 200 at the location of the instance of the application 130 executing in West DC 1 208. The analytics engine may determine that these occurrences occurred within a predetermined time interval based on the timestamps in the log file. The analytics engine may correlate the alerts of the one-way communications with the instance of the application 130 executing in West DC 1 208, to identify a network issue with the instance of the application 130 executing in West DC 1 208. For example, the analytics engine may determine that a network issue exists with the instance of the application 130 executing in West DC 1 208 based on the number of these occurrences being more than a threshold number of occurrences and occurring within a predetermined time interval.

In other embodiments, the analytics engine may identify a network issue with an element in the cloud computing environment based on failed data transmissions or occurrences of one-way communications associated with another cloud computing environment. For example, a virtual interface may be shared across a first subset of accounts associated with a region. However, the virtual interface may not be shared by a second subset of accounts associated with the region. The analytics engine may identify more than a threshold number of failed data transmissions or occurrences of one-way communications associated with the virtual interface over a predetermined time interval. Based on the virtual interface being shared by the first subset of accounts, the analytics engine may determine that there is a network issue with the subset of accounts.

Figure 3:
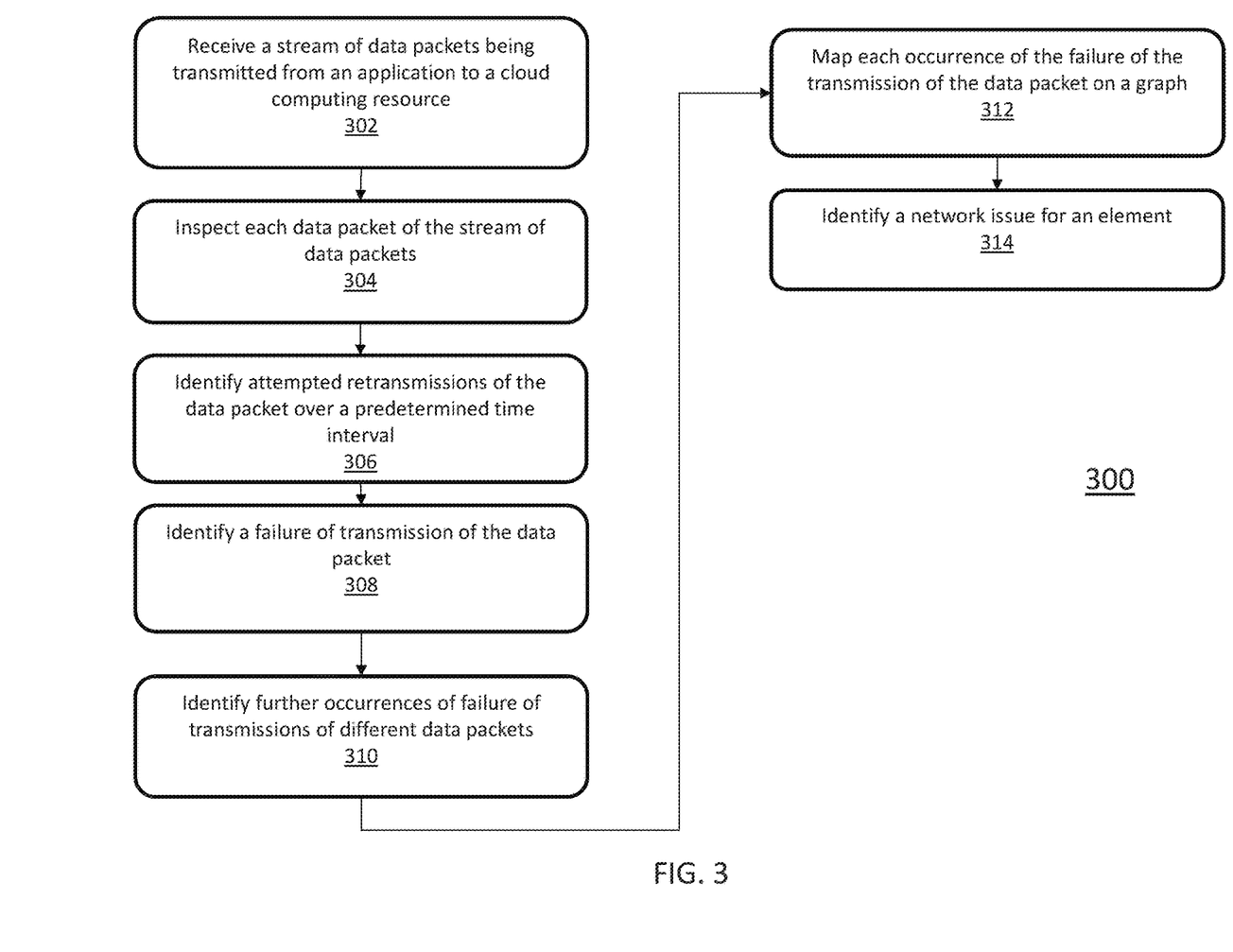
FIG. 3 is a flowchart illustrating a process for identifying network issues in a cloud computing environment based on failed data transmissions, according to an embodiment.

FIG. 3 is a flowchart illustrating a process for identifying network issues in a cloud computing environment based on failed data transmissions, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously or in a different order than shown in FIG. 3, as will be understood by a person of ordinary skill in the art.

Method 300 shall be described with reference to FIG. 1. However, method 300 is not limited to that example embodiment.

In 302, the server receives a copy of the stream of data packets being transmitted from the client application to a cloud computing resource. The stream of data packets may be part of a request being transmitted to the cloud computing resource. For example, the request may be for processing a credit card transaction. Each data packet may include a header and payload data. The header may identify a source IP address and TCP and a destination IP address and TCP.

In 304, the analytics engine inspects each data packet of the stream of data packets. The analytics engine may examine the header and payload data of each data packet, using, for example, deep packet inspection.

In 306, the analytics engine identifies attempted retransmissions of a particular data packet over a predetermined time interval. For example, the analytics engine may examine the sequence numbers of the TCP in the header of the data packet. The sequence numbers may indicate the attempted retransmission of the data packet.

In 308, the analytics engine identifies a failure of transmission of the data packet based on a total number of attempted retransmissions that are more than a threshold number over a predetermined amount of time.

In 310, the analytics engine identifies further occurrences of transmission failures for different data packets to the cloud computing resource over a predetermined time interval. The analytics engine may generate an alert for each failure of transmission of a data packet. The alerts may be stored in the database.

In 312, the analytics engine maps each occurrence of data packet transmission failure on a graph of a cloud computing environment, including the cloud computing resource and elements of the cloud computing environment. The analytics engine may map each occurrence on the location of the graph corresponding to the cloud computing resource.

In 314, the analytics engine identifies a network issue for the element associated with the cloud computing resource based on a total number of occurrences of transmission failures being more than a threshold number and occurring within the predetermined time interval. The analytics engine may correlate the alerts with the occurrences mapped on the graph. The elements may include accounts, regions, data centers, subnets, or the like.

Figure 4:
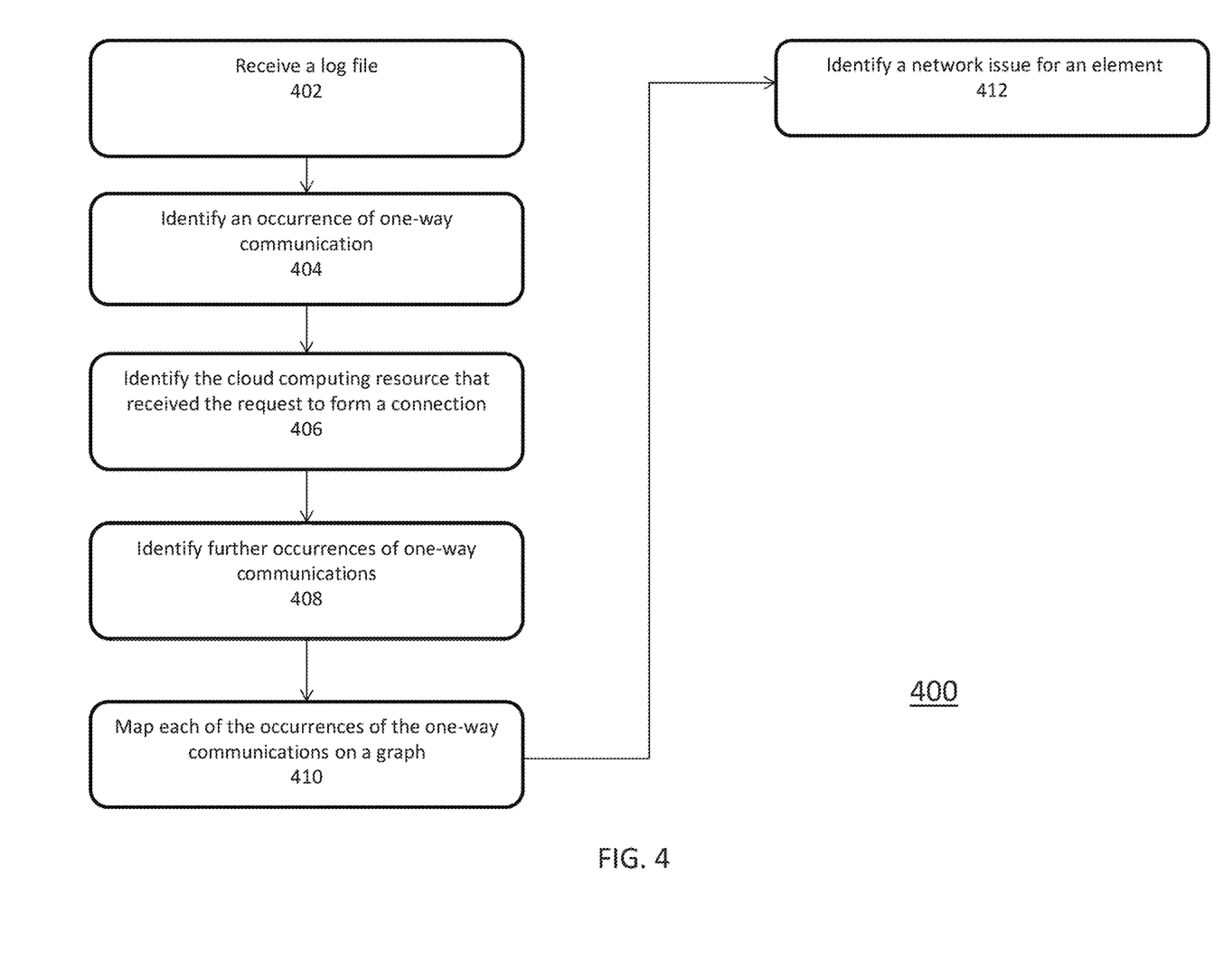
FIG. 4 is a flowchart illustrating a process for identifying network issues in a cloud computing environment based on identified one-way communication, according to an embodiment.

FIG. 4 is a flowchart illustrating the process for identifying network issues in a cloud computing environment based on identified occurrences of one-way communication, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously or in a different order than shown in FIG. 4, as will be understood by a person of ordinary skill in the art.

Method 400 shall be described with reference to FIG. 1. However, method 400 is not limited to that example embodiment.

In 402, the server receives a log file, including information related to communication between the client application and a cloud computing resource in a cloud computing environment. The communication may be an attempt to form a connection between the client application and the cloud computing resource. For each request to form a connection, the cloud computing resource may transmit a response to the client application. The log file may include records of this forward traffic and return traffic. The forward traffic may include an identification of a source (client application) IP and TCP and an identification of a destination (cloud computing resource) IP and TCP. The return traffic may include information about the response from the cloud computing resource to the client application. The return traffic may include an identification of the source (the cloud computing resource) IP and TCP and an identification of the destination (the client application) IP and TCP.

In 404, the analytics engine identifies an occurrence of one-way communication from the client application to the cloud computing resource in the log file. The analytics engine may determine that the log file includes a record of forward traffic but does not include a record of any corresponding return traffic. The analytics engine may identify this as a one-way communication.

In 406, the analytics engine identifies the cloud computing resource that received the request to form a connection with the client application. The analytics engine may identify the cloud computing resource based on the destination IP address and TCP port recorded in the log file.

In 408, the analytics engine identifies further occurrences of one-way communications between other client applications and the same cloud computing resource. The analytics engine may generate an alert for each identified occurrence of one-way communication. The alerts may be stored in the database.

In 410, the analytics engine maps each of the occurrences of the one-way communications on a graph of the cloud computing environment, including the cloud computing resource and elements of the cloud computing environment. The analytics engine may map each occurrence of the one-way communication at a location on the graph of the cloud computing environment corresponding to the cloud computing resource.

In 412, the analytics engine identifies a network issue for an element associated with the cloud computing resource, inside the cloud computing environment, based on the mapping and independent of visibility inside the cloud computing environment. The analytics engine may correlate the alerts and the map of each of the occurrences of the one-way communications. The analytics engine may also correlate the occurrences for packet retransmissions, as described in method 300, and one-way communications to further refine the network issues, as different identified behavior (e.g., retransmissions or one-way communication) might be related to the same underlying issue in the cloud computing environment. Furthermore, other network issues identified by the DPI process, cloud computing logs, and/or external sources can be combined to identify the possible scope of the underlying network issue in the cloud computing environment.

Once the network issue has been identified, the network issue can be reported to an external alert management tool or directly to the cloud computing environment provider. This allows for quick and accurate detection of the network issue, which will result in a quicker resolution of the network issue. This eliminates possible network downtime of an application and data processing time.

Figure 5:
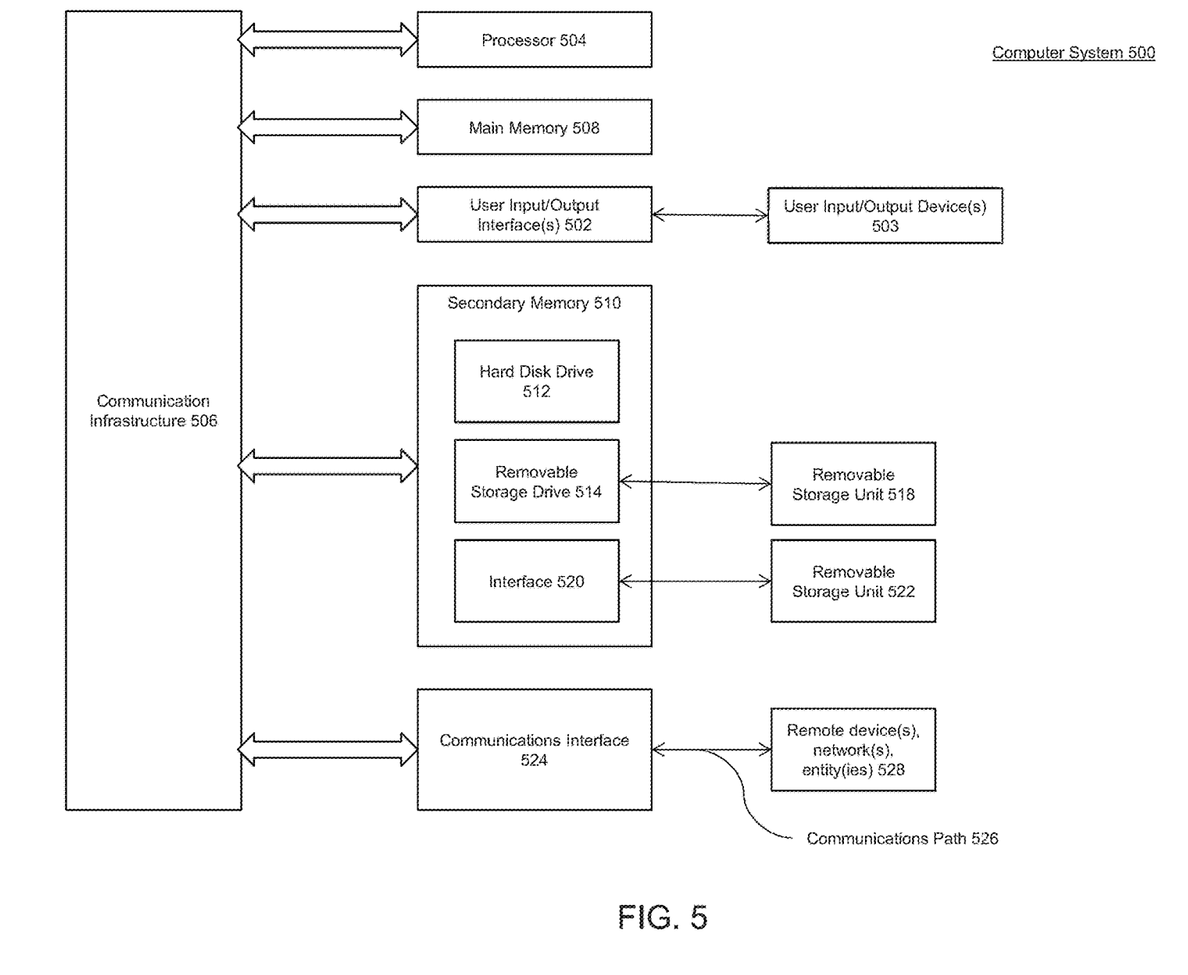
FIG. 5 is a block diagram of example components of a device according to an embodiment.

FIG. 5 is a block diagram of example components of a computer system 500. One or more computer systems 500 may be used, for example, to implement any of the embodiments discussed herein, as well as combinations and sub-combinations thereof, such as server 100, client device 140, or a cloud computing resource 126. Computer system 500 may include one or more processors (also called central processing units, or CPUs), such as a processor 504. Processor 504 may be connected to a communication infrastructure or bus 507.

Computer system 500 may also include user input/output interface(s) 502, such as monitors, keyboards, pointing devices, etc., which may communicate with communication infrastructure 507 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage drive 514.

Removable storage drive 514 may interact with a removable storage unit 518. Removable storage unit 518 may include a computer usable or readable storage device having stored thereon computer software (control logic) and/or data. Removable storage unit 518 may be a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method for identifying network issues, the method comprising:
    receiving, by one or more first computing devices, a stream of data packets being transmitted from an application executing on a second computing device to a cloud computing resource of a third computing device;
    determining, by the one or more first computing devices, failures of prior transmissions of data packets of the stream of data packets within a predetermined time interval in response to determining that the data packets of the stream are retransmissions;
    generating a first alert indicating the failures of the prior transmissions of the data packets;
    mapping, by the one or more first computing devices, occurrences of the failures of the prior transmissions of the data packets on a graph of a cloud computing environment including the cloud computing resource and elements of the cloud computing environment; and
    identifying, by the one or more first computing devices, a network issue for an element associated with the cloud computing resource based on a total number of occurrences of the failures being more than a threshold number and occurring within the predetermined time interval by correlating the first alert, the mapped occurrences of the failures, a second alert indicating any one-way communications comprising requests for which no responses were received, and a map of the one-way communications, and independent of visibility of the stream of data packets inside the cloud computing environment.

2. The method of claim 1, wherein the failures of the prior transmissions of the data packets include dropping the data packets or a threshold number of attempted retransmissions of the data packets.

3. The method of claim 1, further comprising identifying, by the one or more first computing devices, the cloud computing resource intended to receive the data packets based on an identification of an IP address and TCP port of the cloud computing resource included in the data packets.

4. The method of claim 1, further comprising generating, by the one or more first computing devices, the first alert in response to determining that the total number of occurrences of transmission failures within the predetermined time interval is more than the threshold number.

5. The method of claim 1, further comprising generating, by the one or more first computing devices, a report of the network issue.

6. The method of claim 1, wherein the element includes at least one of: a cloud computing region, account, or subnet.

7. The method of claim 1, wherein the one-way communications indicate failed connections.

8. The method of claim 1, wherein the graph hierarchically represents the elements of the cloud computing environment.

9. A non-transitory computer-readable medium storing instructions, wherein the instructions, when executed by a processor of a first computing device, cause the processor to perform operations comprising:

receiving a stream of data packets being transmitted from an application executing on a second computing device to a cloud computing resource of a third computing device;

determining failures of prior transmissions of data packets of the stream of data packets within a predetermined time interval in response to determining that the data packets of the stream are retransmissions;

generating a first alert indicating the failures of the prior transmissions of the data packets;

mapping occurrences of the failures of the prior transmissions of the data packets on a graph of a cloud computing environment including the cloud computing resource and elements of the cloud computing environment; and identifying a network issue for an element associated with the cloud computing resource based on a total number of occurrences of the failures being more than a threshold number and occurring within the predetermined time interval by correlating the first alert, the mapped occurrences of the failures, a second alert indicating any one-way communications comprising requests for which no responses were received, and a map of the one-way communications, and independent of visibility of the stream of data packets inside the cloud computing environment.

10. The non-transitory computer-readable medium of claim 9, wherein the failures of the prior transmissions of the data packets include dropping the data packets or a threshold number of attempted retransmissions of the data packets.

11. The non-transitory computer-readable medium of claim 9, the operations further comprising identifying the cloud computing resource intended to receive the data packets based on an IP address and TCP port of the cloud computing resource included in the data packets.

12. The non-transitory computer-readable medium of claim 9, the operations further comprising generating the first alert in response to determining the total number of occurrences of transmission failures within the predetermined time interval is more than the threshold number.

13. The non-transitory computer-readable medium of claim 9, the operations further comprising generating a report of the network issue.

14. The non-transitory computer-readable medium of claim 9, wherein the element includes at least one of: a cloud computing region, account, or subnet.

15. A method for identifying network issues, the method comprising:

receiving, by one or more first computing devices, a log file including information related to communication between an application executing on a second computing device and a cloud computing resource of a third computing device in a cloud computing environment;

identifying, by the one or more first computing devices, an occurrence of a one-way communication from the application to the cloud computing resource in the log file, the one-way communication comprising a request from the application to the cloud computing resource for which no response was received;

generating a first alert indicating the occurrence of the one-way communication;

identifying, by the one or more first computing devices, the cloud computing resource intended to receive the one-way communication;

mapping, by the one or more first computing devices, the occurrence of the one-way communication on a graph of the cloud computing environment including the cloud computing resource and elements of the cloud computing environment; and identifying, by the one or more first computing devices, a network issue for an element associated with the cloud computing resource by correlating the first alert, a mapped occurrence of a failure, a second alert indicating failures of transmissions of data packets that is generated based on determining that a total number of occurrences of the failures within a predetermined time interval is more than a threshold number, and a map of the failures of transmissions, and independent of visibility inside the cloud computing environment.

16. The method of claim 15, wherein the one-way communication indicates a failed connection.

17. The method of claim 15, further comprising identifying, by the one or more first computing devices, the cloud computing resource intended to receive the one-way communication based on an IP address and TCP port of the cloud computing resource included in the log file.

18. The method of claim 15, wherein the log file is iteratively updated and received after every predetermined time interval.

19. The method of claim 15, further comprising generating, by the one or more first computing devices, a report of the network issue.

20. The method of claim 15, wherein the element includes at least one of: a cloud computing region, account, or subnet.

* * * * *